United States Patent [19]

Aeschlimann

[11] Patent Number: 5,616,695

[45] Date of Patent: Apr. 1, 1997

[54] AZO DYES CONTAINING A 1-ALKYL-6-HYDROXY-4-METHYL-3-SULFOMETHYL-PYRID-2-ONE COUPLING COMPONENT

[75] Inventor: Peter Aeschlimann, Allschwil, Switzerland

[73] Assignee: Ciba-Geigy Corporation, Tarrytown, N.Y.

[21] Appl. No.: 519,227

[22] Filed: Aug. 25, 1995

[30] Foreign Application Priority Data

Aug. 30, 1994 [CH] Switzerland ............... 2652/94
Sep. 16, 1994 [CH] Switzerland ............... 2838/94

[51] Int. Cl.$^6$ .................. C09B 62/491; C09B 62/493; D06P 1/38
[52] U.S. Cl. ............................................. 534/643
[58] Field of Search ................................ 534/643

[56] References Cited

U.S. PATENT DOCUMENTS

| | | | |
|---|---|---|---|
| 4,283,331 | 8/1981 | Seitz et al. | 534/643 |
| 4,382,890 | 5/1983 | de Montmollin et al. | 534/643 |
| 4,652,633 | 3/1987 | Lamm | 534/773 |
| 5,391,718 | 2/1995 | Tzikas et al. | 534/637 |

FOREIGN PATENT DOCUMENTS 0024668  3/1981  European Pat. Off. ........ 534/643

*Primary Examiner*—Floyd D. Higel
*Attorney, Agent, or Firm*—Kevin T. Mansfield

[57] ABSTRACT

The invention relates to azo dyes of formula

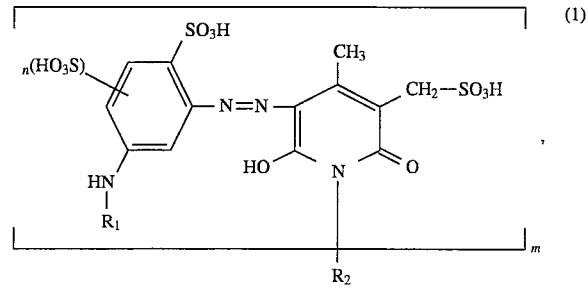

wherein $R_1$ is acryloyl, α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, n is 0 or 1 and m is 1;

or wherein $R_1$ is acryloyl, α-haloacryloyl, α-methylacryloyl or α,β-dihalopropionyl, $R_2$ is $C_2$–$C_8$alkylene which is unsubstituted or substituted by hydroxy, halogen, $C_1$–$C_4$alkoxy, n is 0 or 1 and m is 2.

The dyes are suitable for dyeing nitrogen-containing or hydroxyl group-containing fibre materials.

15 Claims, No Drawings

AZO DYES CONTAINING A 1-ALKYL-6-HYDROXY-4-METHYL-3-SULFOMETHYL-PYRID-2-ONE COUPLING COMPONENT

The present invention relates to novel azo dyes, to a process for their preparation and to the use thereof for dyeing and printing fibre materials, in particular textile fibre materials. Specifically, the invention relates to azo dyes of formula

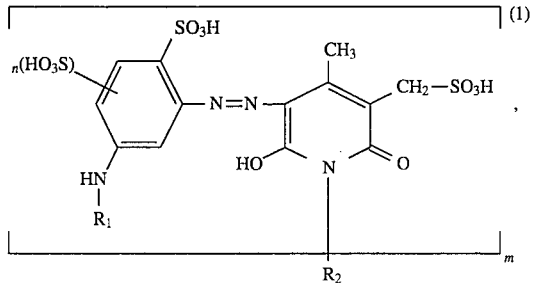
(1)

wherein $R_1$ is acryloyl, α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, n is 0 or 1 and m is 1;

or wherein $R_1$ is acryloyl, α-haloacryloyl, α-methylacryloyl or α,β-dihalopropionyl, $R_2$ is $C_2$–$C_8$alkylene which is unsubstituted or substituted by hydroxy, halogen, $C_1$–$C_4$alkoxy, n is 0 or 1 and m is 2.

$R_1$ defined as α-haloacryloyl will typically be —CO—C(Br)=CH$_2$ and —CO—C(Cl)=CH$_2$. $R_1$ defined as α,β-dihalopropionyl will typically be α,β-dibromopropionyl or α,β-dichloropropionyl.

$R_2$ defined as $C_1$–$C_5$alkyl is typically methyl, ethyl, propyl, isopropyl, sec-butyl, n-butyl, tert-butyl, isobutyl or n-pentyl, which radicals may be substituted as indicated above. Substituted alkyl radicals may suitably be: β-sulfoethyl, β-hydroxyethyl, β-sulfatoethyl.

$R_2$ defined as $C_2$–$C_8$alkylene is typically —CH$_2$—CH$_2$—, —CH$_2$—CH$_2$—CH$_2$—, —CH$_2$—(CH$_2$)$_2$—CH$_2$—, —CH$_2$—(CH$_2$)$_3$—CH$_2$—, —CH$_2$—(CH$_2$)$_4$—CH$_2$—, —CH$_2$—CH(CH$_3$)—CH$_2$—CH$_2$—, —CH$_2$—(CH$_2$)$_5$—CH$_2$—, —CH$_2$—CH(CH$_3$)—(CH$_2$)$_4$—CH$_2$—.

Preferred azo dyes are those of formula

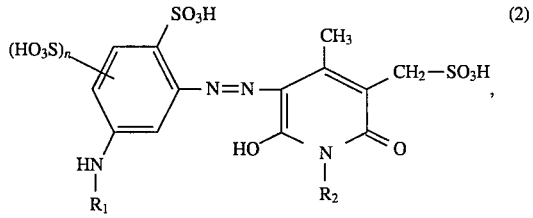
(2)

wherein $R_1$ is acryloyl, α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, and n is 0 or 1.

Particularly preferred azo dyes of formula (2) are those wherein $R_1$ is acryloyl, α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, and n is 1; or wherein $R_1$ is acryloyl, α-haloacryloyl, α-methylacryloyl, $R_2$ is $C_1$–$C_5$alkyl which is unsubstituted or substituted by halogen, cyano, hydroxy, sulfo, sulfato or $C_1$–$C_4$alkoxy, and n is 0.

Further preferred azo dyes are those of formula

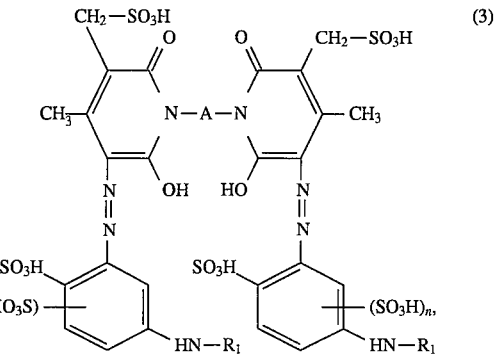
(3)

wherein $R_1$ is as defined for formula (1), A is alkylene of 2 to 6 carbon atoms, and n is or 1.

Particularly preferred azo dyes of formula (2) are also those wherein $R_1$ is α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, and n is 0 or, preferably, 1.

Azo dyes of formula (2), wherein $R_1$ is α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, and n is 0, are likewise particularly preferred.

Other particularly preferred azo dyes are those of formula (3), wherein $R_1$ is acryloyl, α-bromoacryloyl, α-methylacryloyl, α-chloroacryloyl, α,β-dibromopropionyl or α,β-dichloropropionyl, A is —CH$_2$—CH$_2$—, —CH$_2$—CH$_2$—CH$_2$—, —CH$_2$—(CH$_2$)$_2$—CH$_2$—, —CH$_2$—(CH$_2$)$_3$—CH$_2$—, —CH$_2$—(CH$_2$)$_4$—CH$_2$—, —CH$_2$—CH(CH$_3$)—CH$_2$—CH$_2$—, and n is 0 or 1.

Very particularly preferred azo dyes of formula (2) are those wherein $R_1$ is acryloyl, α-bromoacryloyl or α-methylacryloyl, $R_2$ is ethyl, and n is 0.

The azo dyes of formula (2), wherein $R_2$ is $C_1$–$C_3$alkyl, preferably methyl or ethyl, are also very particularly preferred.

The azo dyes of formula (3), wherein $R_1$ is acryloyl, α-bromoacryloyl or α-methylacryloyl, A is —CH$_2$—CH$_2$—, —CH$_2$—CH$_2$—CH$_2$—, —CH$_2$—(CH$_2$)$_2$—CH$_2$—, —CH$_2$—(CH$_2$)$_3$—CH$_2$—, —CH$_2$—(CH$_2$)$_4$—CH$_2$—, —CH$_2$—CH(CH$_3$)—CH$_2$—CH$_2$—, and n is 0 or 1, are likewise very particularly preferred.

Important azo dyes are those of formula (2), wherein $R_1$ is α-bromoacryloyl.

Other important azo dyes are those of formula

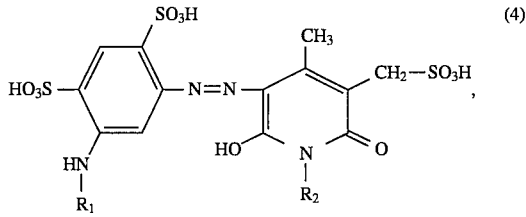
(4)

wherein $R_1$ and $R_2$ are as defined in connection with formula (2), especially wherein $R_1$ and $R_2$ have the preferred meanings cited above.

The azo dyes of formula (4), wherein $R_1$ is α-bromoacryloyl and $R_2$ is methyl or ethyl, are of particular importance.

Of very particular importance are the azo dye of formula

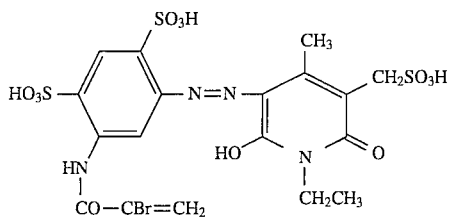 (5)

and the azo dye of formula

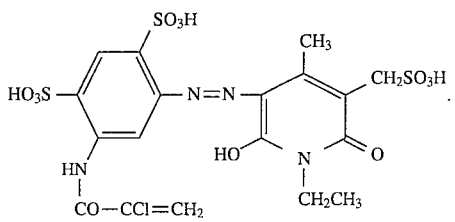 (6)

The invention further relates to a process for the preparation of the azo dyes of formula (1), which comprises diazotising an amine of formula

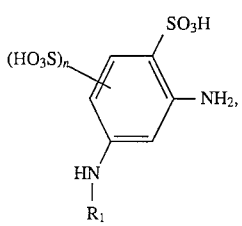 (7)

wherein $R_1$ and n are as defined for formula (1), and coupling the diazo compound so obtained to a coupling component of formula

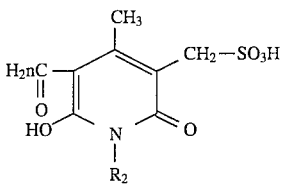 (8)

or

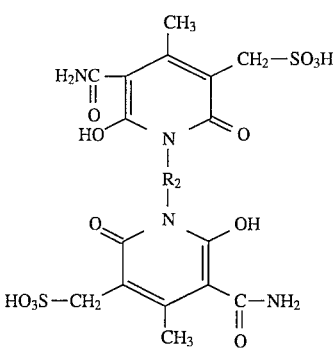 (9)

wherein $R_2$ is as defined for formula (1), using in the case of the coupling component of formula (8) an equimolar amount of the coupling component and, in the case of the coupling component of formula (9), half the equimolar amount of the coupling component.

The amines of formula (7) and the coupling components of formulae (8) and (9) are known or can be prepared in analogy to known methods.

The diazotisation of the amines of formula (7) is carried out in per se known manner, typically with a nitrite, e.g. an alkali metal nitrite such as sodium nitrite, in a medium containing a mineral acid, e.g. in a medium containing hydrochloric acid, in the temperature range from typically −5° to +30° C. and, preferably, at 0° to 10° C.

The coupling to the coupling component of formula (8) or (9) is carded out in per se known manner in the acid, neutral or alkaline pH range and in the temperature range from typically 0° to 30° C.

Illustrative examples of compounds of formula (7) are 2,4-disulfo-5-(α,β-dibromopropionylamino)aniline, 2-sulfo-5-(α,β-dibromopropionylamino)aniline, 2-sulfo-5-acryloylaminoaniline, 2,4-disulfo-5-acryloylaminoaniline, 2,4-disulfo-5-(α-bromoacryloylamino)aniline, 2-sulfo-5-(α-bromoacryloylamino)aniline, 2,4-disulfo-5-(α-methylacryloylamino)aniline, 2-sulfo-5-(α-methylacryloylamino)aniline, 2,4-disulfo-5-(α-chloroacryloylamino)aniline, and 2-sulfo-5-(α-chloroacryloylamino)aniline.

Illustrative examples of coupling components of formula (8) are 5-aminocarbonyl-1,4-di-methyl-6-hydroxy-3-sulfomethylpyrid-2-one, 5-aminocarbonyl-1-ethyl-4-methyl-6hydroxy-3-sulfomethylpyrid-2-one, 5-aminocarbonyl-1-(β-sulfoethyl)-4-methyl-6-hydroxy-3-sulfomethylpyrid-2-one and 5-aminocarbonyl-1-isopropyl-4-methyl-6-hydroxy-3-sulfomethyl-pyrid-2-one.

Illustrative examples of coupling components of formula (9) are:

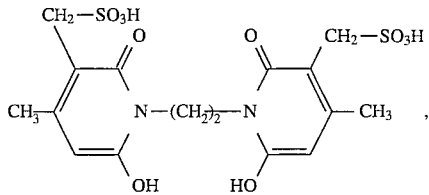

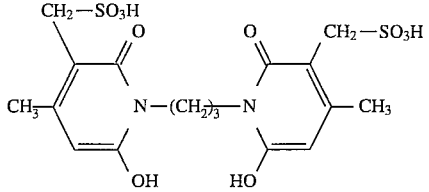

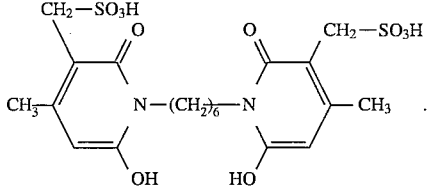

The coupling components of formula (9) can be obtained by hydrolysis of the cyano group to the carbamoyl group of a known doubled cyanomethylpyridone of formula

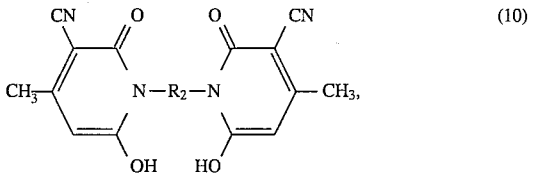 (10)

by treatment in aqueous sulfuric acid at elevated temperature (80° C.) to hydrolyze the cyano group into carbon amido, and subsequent reaction with the adduct of formaldehyde and bisulfite or pyrosulfite under neutral conditions and at slightly elevated temperature (50° C.) to give the compound of formula (9). In the subsequent coupling, the carbamoyl group is substituted by the diazo radical to give a dye of the general formula (1), wherein m=2.

The amines of formula (7) can be obtained by acylating a diamine of formula

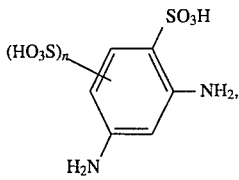

wherein n has the meaning given for formula (1), with a compound of formula

Hal-R$_1$  (12), wherein Hal is halogen and R$_1$ is as defined for formula (1).

The acylation is carried out in the neutral to the weakly acidic pH range and in the temperature range from 0° to 15° C.

Preferred embodiments of the novel process comprise:

diazotising an amine of formula (7), wherein R$_1$ is α-haloacryloyl, α-methylacryloyl or α,β-dihalopropionyl, and n is 1, and coupling the diazo compound so obtained to the coupling component of formula (8), wherein R$_2$ is C$_1$–C$_5$alkyl which is unsubstituted or substituted by halogen, cyano, hydroxy, sulfo, sulfato or C$_1$–C$_4$alkoxy, or to a coupling component of formula (8), wherein A is alkylene of 2 to 6 carbon atoms;

diazotising an amine of formula (7), wherein R$_1$ is α-haloacryloyl or α-methylacryloyl, and n is 0, and coupling the diazo compound so obtained to the coupling component of formula (8), wherein R$_2$ is C$_1$–C$_5$alkyl which is unsubstituted or substituted by halogen, cyano, hydroxy, sulfo, sulfato or C$_1$–C$_4$alkoxy;

diazotising an amine of formula (7), wherein R$_1$ is α-bromoacryloyl or α-methylacryloyl, and n is 0, and coupling the diazo compound so obtained to the coupling component of formula (8), wherein R$_2$ is ethyl, or to a coupling component of formula (9), wherein A is —CH$_2$—CH$_2$—, —CH$_2$—CH$_2$—CH$_2$—, —CH$_2$—(CH$_2$)$_2$—CH$_2$—, —CH$_2$—(CH$_2$)$_3$—CH$_2$—, —CH$_2$—(CH$_2$)$_4$—CH$_2$—, —CH$_2$—CH(CH$_3$)—CH$_2$—CH$_2$—;

diazotising an amine of formula (7), wherein R$_1$ is α-bromoacryloyl, α-methylacryloyl, α-chloroacryloyl, α,β-dibromopropionyl or α,β-dichloropropionyl, and n is 1, and coupling the diazo compound so obtained to the coupling component of formula (8), wherein R$_2$ is methyl, ethyl or β-sulfoaethyl;

using an amine of formula (7), wherein R$_1$ is α-bromoacryloyl;

using a coupling component of formula (8), wherein R$_2$ is C$_1$–C$_3$alkyl, preferably methyl or ethyl;

using a coupling component of formula (9), wherein A is —CH$_2$—CH$_2$—, CH$_2$—CH$_2$—CH$_2$—, —CH$_2$—(CH$_2$)$_2$—CH$_2$—, —CH$_2$—(CH$_2$)$_3$—CH$_2$—, —CH$_2$—(CH$_2$)$_4$—CH$_2$—, CH$_2$—CH(CH$_3$)—CH$_2$—CH$_2$—.

Important embodiments of the novel process comprise diazotising an amine of formula

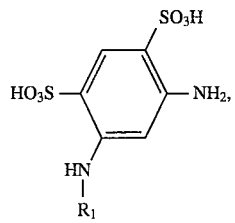

wherein R$_1$ is as defined for formula (1), preferably α-bromoacryloyl, and coupling the diazo compound so obtained to a coupling component of formula (8), wherein R$_2$ is as defined for formula (1), preferably methyl or ethyl;

diazotising an amine of formula

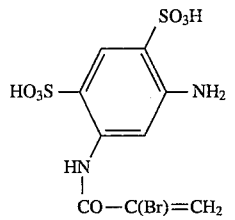

and coupling the diazo compound so obtained to a coupling component of formula

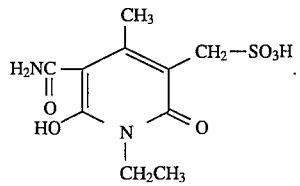

The dyes of formula I are obtained either in the form of their free acid or, preferably, as salts thereof.

Suitable salts are the alkali metal salts or ammonium salts or the salts of an organic amine.

Suitable salts are typically the sodium, lithium, potassium or ammonium salts or the salt of mono-, di- or triethanolamine.

The novel azo dyes of formula (1) are suitable for dyeing and printing in per se known manner nitrogen-containing or hydroxyl group-containing fibre materials, paper or leather, e.g. textile fibre materials of cellulose, silk and natural and synthetic polyamides. The azo dyes of formula (1) can be used in standard or previously pretreated form for dyeing and printing. Level dyeings in yellow shades of good allround fastness properties are obtained, in particular good fastness to rubbing, wet rubbing and light. The novel dyes are also readily water-soluble. They also have good build-up and have good compatibility with other dyes. The novel azo dyes are also distinguished by good fixation in state-of-the-art fixation processes, typically fixation by electron beams or UV-light. The dyeings obtained have very good stability of shade in end-use fastness properties (e.g. washfastness). The textile material can be in any form of presentation, e.g. as fibres, yarn, woven or knitted fabrics.

In the following Examples parts are by weight. The relationship of parts by weight to parts by volume is the same as that of the gram to the cubic centimeter.

EXAMPLE 1

Preparation of the diazo component 26.8 g of 1,3-phenylenediamine-4,6-disulfonic acid are dissolved in water at pH 4 and the solution is cooled to 0°–5° C. Then 26.3 g of 2,3-dibromopropionyl chloride are added dropwise, with vigorous stirring, while keeping the pH constant at 2.0 by the dropwise addition of aqueous sodium hydroxide solution. The reaction is complete when the thin-layer chromatogram shows that no more starting material is present. The reaction mass is then acidified with conc. hydrochloric acid to pH 0.8, filtered cold and the filter product is washed with dilute hydrochloric acid, giving the compound of formula

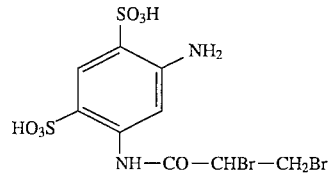
(1000)

in pure form.
Preparation of the dye of formula

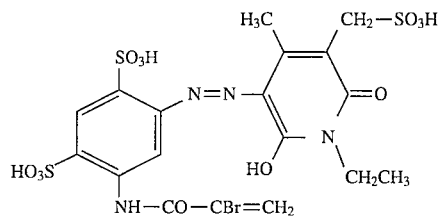
(101)

24.1 g of the amine of the formula (1000) are stirred in water and acrylated at 30° C. and pH 10 for 10 minutes. The solution is then neutralised with 12.5 ml of a 4-molar solution of sodium nitrite and cooled to 5° C. Ice is then added, followed by the addition of 12.5 ml of conc. hydrochloric acid (33%). Diazotisation is carried out for 30 minutes and excess nitrite is then destroyed by addition of sulfamic acid. Then 14.5 g of the coupling component of formula

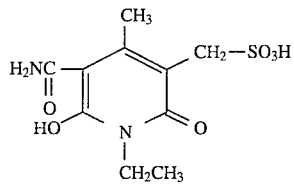

in the form of an aqueous solution are added, the pH is adjusted to 6–7, and the temperature is allowed to rise to 20° C. When the coupling is complete, the dye is salted out with 20% by volume of sodium chloride. The precipitated dye is isolated by filtration and washed with a solution of sodium chloride. The dye is a yellow powder in the form of the free acid of formula (101) above.

The procedure described in Example 1 is repeated, but replacing the amine of formula

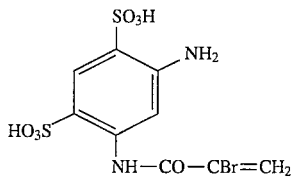

with an equimolar amount of the amine of formula

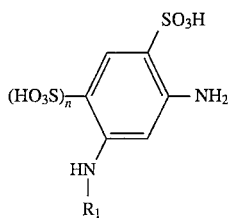

wherein $R_1$ and n have the meanings given in the following Table, and replacing as coupling component the compound of formula

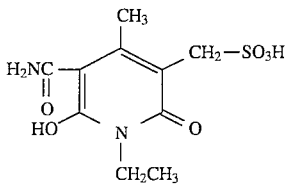

with an equimolar amount of the compound of formula

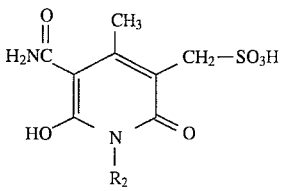

wherein $R_2$ has the meanings given in the following Table 1, to give yellow dyeing dyes having good allround fastness properties.

TABLE 1

| Example 1 | $R_1$ | n | $R_2$ |
|---|---|---|---|
| 2 | —CO—CBr=CH$_2$ | 1 | —CH$_2$CH$_3$ |
| 3 | —CO—CHBr—CH$_2$Br | 1 | —CH$_2$CH$_3$ |
| 4 | —CO—C(CH$_3$)=CH$_2$ | 1 | —CH$_2$CH$_3$ |
| 5 | —CO—CCl=CH$_2$ | 1 | —CH$_2$CH$_3$ |
| 6 | —CO—CHCl—CH$_2$Cl | 1 | —CH$_2$CH$_3$ |
| 7 | —CO—CBr=CH$_2$ | 0 | —CH$_2$CH$_3$ |
| 8 | —CO—C(CH$_3$)=CH$_2$ | 0 | —CH$_2$CH$_3$ |
| 9 | —CO—CBr=CH$_2$ | 1 | —CH$_3$ |
| 10 | —CO—CBr=CH$_2$ | 0 | —CH$_2$CH$_2$SO$_3$H |
| 11 | —COCH=CH$_2$ | 0 | —CH$_2$CH$_3$ |
| 12 | —COCH=CH$_2$ | 1 | —CH$_2$CH$_3$ |
| 13 | —COCH=CH$_2$ | 1 | —CH$_3$ |
| 14 | —COCH=CH$_2$ | 1 | —CH(CH$_3$)$_2$ |

EXAMPLE 15 to 29

The procedure of Example 1 is repeated, but replacing the amine of formula

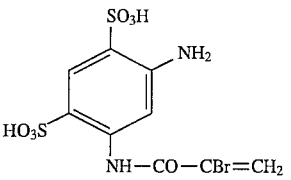

with an equimolar amount of the amine of formula

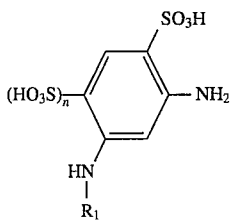

wherein $R_1$ and n have the meanings given in the following Table 2, and replacing as coupling component the compound of formula

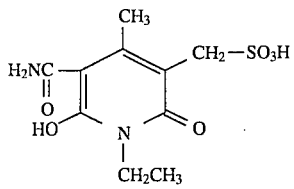

by half the equimolar amount of the compound of formula

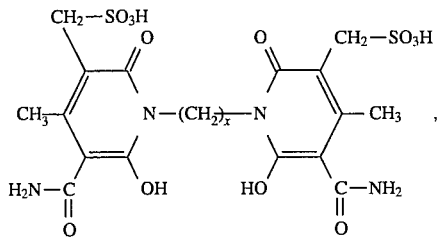

wherein x has the meanings given in the following Table 2, and in the coupling reaction the carbamoyl group is substituted by the diazo radical, to give yellow dyeing dyes having good allround fastness properties.

TABLE 2

| Example 1 | $R_1$ | n | x |
|---|---|---|---|
| 15 | —CO—CBr=$CH_2$ | 1 | 2 |
| 16 | —CO—CHBr—$CH_2$Br | 0 | 2 |
| 17 | —CO—CBr=$CH_2$ | 1 | 3 |
| 18 | —CO—CBr=$CH_2$ | 0 | 3 |
| 19 | —CO—C($CH_3$)=$CH_2$ | 1 | 2 |
| 20 | —CO—C($CH_3$)=$CH_2$ | 0 | 2 |
| 21 | —CO—C($CH_3$)=$CH_2$ | 1 | 6 |
| 22 | —CO—CCl=$CH_2$ | 1 | 2 |
| 23 | —CO—CCl=$CH_2$ | 0 | 2 |
| 24 | —CO—CCl=$CH_2$ | 1 | 3 |
| 25 | —CO—CCl=$CH_2$ | 0 | 3 |
| 26 | —CO—CH=$CH_2$ | 1 | 2 |
| 27 | —CO—CH=$CH_2$ | 0 | 2 |
| 28 | —CO—CH=$CH_2$ | 1 | 6 |
| 29 | —CO—CBr=$CH_2$ | 1 | 6 |

Dyeing Example I 10 parts of polyamide 66 fabric are dyed in 500 parts of an aqueous liquor containing 2 g/l of ammonium acetate and adjusted to pH 5 with acetic acid. The concentration of dye of Example 7 is 0.5%, based on the weight of the fabric. The dyeing time is 30 to 90 minutes at a temperature of 98° C. The dyed polyamide 66 fabric is then removed from the bath and washed and dried in conventional manner.

The polyamide 66 fabric is dyed in a pure yellow shade having good allround fastness properties.

Dyeing Example II 2 parts of the dye of Example 5 are dissolved in 100 parts of water. The solution is added to 1900 parts of cold water, then 60 parts of sodium chloride are added and 100 parts of cotton fabric are put into this dyebath. The temperature is raised to 60° C. and, after 30 minutes, 40 parts of anhydrous $Na_2CO_3$ and a further 60 parts of sodium chloride are added. The temperature is held for 30 minutes at 60° C., and the dyed fabric is rinsed and soaped for 15 minutes in a 0.3% solution of a nonionic detergent at boiling temperature, then rinsed and dried, giving a yellow dyed cotton fabric having very good allround fastness properties.

Dyeing Example III 0.1 pan of the dye of Example 1 is dissolved in 200 parts of water and to the solution are added 0.5 pan of sodium sulfate, 0.1 part of a levelling agent (based on the condensate of a higher aliphatic amine and ethylene oxide) and 0.5 part of sodium acetate. The pH is then adjusted with acetic acid (80%) to 5.5. The dyebath is heated for 10 minutes to 50° C. and 10 parts of wollen fabric are put into it. The dyebath is heated to a temperature of 100° C. over c. 50 minutes and dyeing is carded out at this temperature. Afterwards the dyebath is cooled to 90° C. and the goods are removed. The woollen fabric is washed with warm and cold water, then centrifuged and dried, The resultant yellow woollen fabric has good light-and wetfastness properties.

What is claimed is:

1. An azo dye of formula

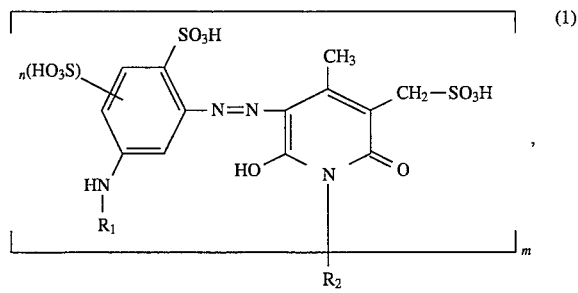

wherein $R_1$ is acryloyl, α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, n is 0 or 1 and m is 1;

or wherein $R_1$ is acryloyl, α-haloacryloyl, α-methylacryloyl or α,β-dihalopropionyl, $R_2$ is $C_2$–$C_8$alkylene which is unsubstituted or substituted by hydroxy, halogen, $C_1$–$C_4$alkoxy, n is 0 or 1 and m is 2.

2. An azo dye according to claim 1 of formula

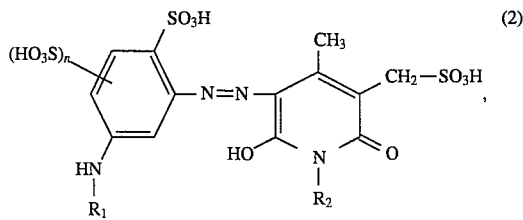

wherein $R_1$ is acryloyl, α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, and n is 0 or 1.

3. An azo dye according to claim 1 of formula

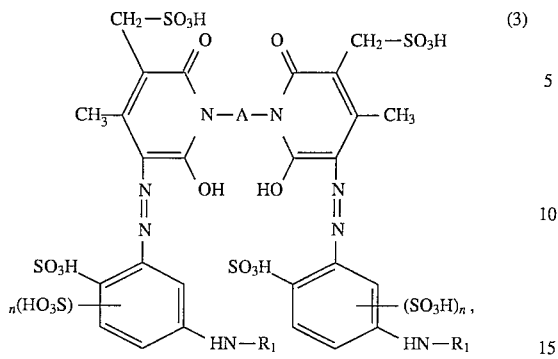

wherein $R_1$ is as defined in claim 1, A is alkylene of 2 to 6 carbon atoms, and n is 0 or 1.

4. An azo dye according to claim 2, wherein $R_1$ is α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$14 $C_4$alkoxy, and n is 0 or 1.

5. An azo dye according to claim 2, wherein $R_1$ is α-haloacryloyl, α-methylacryloyl or α,β-dihalopropionyl, $R_2$ is $C_1$–$C_5$alkyl which is unsubstituted or substituted by halogen, cyano, hydroxy, sulfo, sulfato or $C_1$–$C_4$alkoxy, and n is 0.

6. An azo dye according to claim 3, wherein $R_1$ is acryloyl, α-bromoacryloyl, α-methylacryloyl, α-chloroacryloyl, α,β-dibromopropionyl or α,β-dichloropropionyl, A is —$CH_2$—$CH_2$—, —$CH_2$—$CH_2$—$CH_2$—, —$CH_2$—($CH_2$)$_2$—$CH_2$—, $CH_2$—($CH_2$)$_3$—$CH_2$—, —$CH_2$—$CH_2$)$_4$—$CH_2$—, —$CH_2$—$CH(CH_3)$—$CH_2$—$CH_2$—, and n is 0 or 1.

7. An azo dye according to claim 5, wherein $R_1$ is acryloyl, α-bromoacryloyl or α-methylacryloyl, $R_2$ is ethyl, and n is 0.

8. An azo dye according to claim 5, wherein $R_2$ is $C_1$–$C_3$alkyl.

9. An azo dye according to claim 6, wherein $R_1$ is acryloyl, α-bromoacryloyl or α-methylacryloyl, A is —$CH_2$—$CH_2$—, —$CH_2$—$CH_2$—$CH_2$—, —$CH_2$—($CH_2$)$_2$—$CH_2$—, —$CH_2$—($CH_2$)$_3$—$CH_2$—, —$CH_2$—($CH_2$)$_4$—$CH_2$—, —$CH_2$—$CH(CH_3)$—$CH_2$—$CH_2$—, and n is 0 or 1.

10. An azo dye according to claim 2 of formula

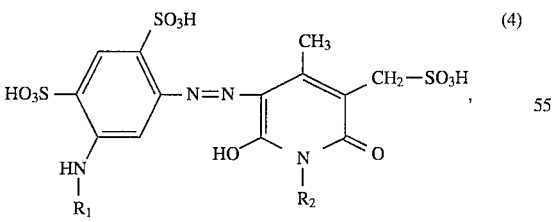

wherein $R_1$ and $R_2$ are as defined in claim 2.

11. An azo dye according to claim 10, wherein $R_1$ is α-bromoacryloyl and $R_2$ is methyl or ethyl.

12. The azo dye according to claim 11 of formula

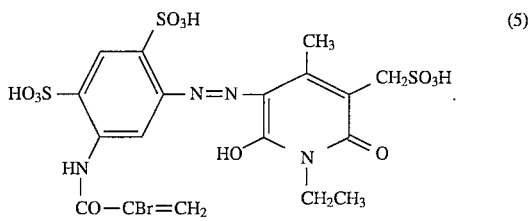

13. The azo dye according to claim 10 of formula

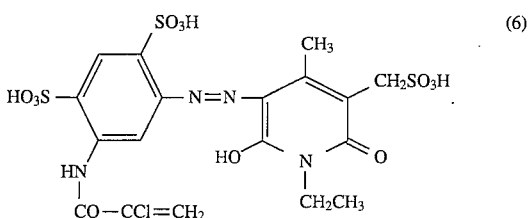

14. A process for the preparation of an azo dye of formula (1), which comprises diazotising an amine of formula

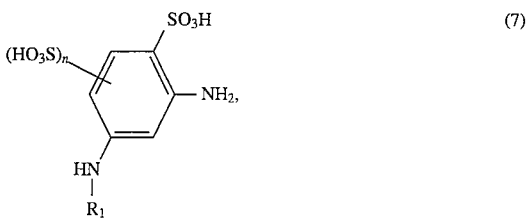

wherein $R_1$ and n are as defined claim 1, and coupling the diazo compound so obtained to a coupling component of formula

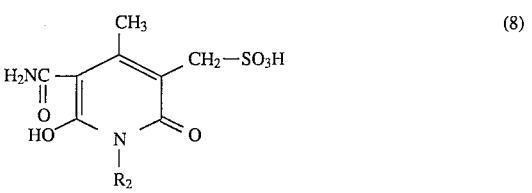

or

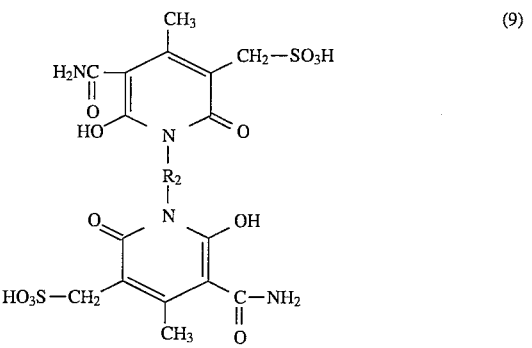

wherein $R_2$ is as defined in claim 1.

15. Method of dyeing or printing a nitrogen-containing or hydroxyl-containing fiber material, which comprises applying to said fibre material of an azo dye according to claim 1.

* * * * *